US009025594B1

(12) United States Patent
Mok et al.

(10) Patent No.: US 9,025,594 B1
(45) Date of Patent: May 5, 2015

(54) MULTIPLEXING LOW-ORDER TO HIGH-ORDER ODU SIGNALS IN AN OPTICAL TRANSPORT NETWORK

(71) Applicant: PMC-Sierra US, Inc., Sunnyvale, CA (US)

(72) Inventors: Winston Ki-Cheong Mok, Vancouver (CA); Somu Karuppan Chetty, Vancouver (CA); Jonathan Avey, Vancouver (CA)

(73) Assignee: PMC-Sierra US Inc., Sunnyvale, CA (US)

( * ) Notice: Subject to any disclaimer, the term of this patent is extended or adjusted under 35 U.S.C. 154(b) by 96 days.

(21) Appl. No.: 13/835,443

(22) Filed: Mar. 15, 2013

Related U.S. Application Data

(60) Provisional application No. 61/704,259, filed on Sep. 21, 2012.

(51) Int. Cl.
*H04J 3/02* (2006.01)
*H04J 14/00* (2006.01)
*H04J 3/16* (2006.01)
*H04J 14/02* (2006.01)

(52) U.S. Cl.
CPC ............... *H04J 14/00* (2013.01); *H04J 3/1658* (2013.01); *H04J 14/025* (2013.01)

(58) Field of Classification Search
CPC ... H04J 3/1658; H04J 14/025; H04J 14/0246; H04J 14/0283
USPC .......... 370/535, 369, 537, 539, 389; 398/154, 398/5, 140, 58, 45
See application file for complete search history.

(56) References Cited

U.S. PATENT DOCUMENTS

| | | | |
|---|---|---|---|
| 7,782,843 B2 * | 8/2010 | Zou et al. ...................... | 370/360 |
| 8,170,421 B2 * | 5/2012 | Li ................................. | 398/154 |
| 8,638,683 B2 * | 1/2014 | Honma et al. ................. | 370/252 |
| 8,731,398 B2 * | 5/2014 | Akiyama et al. ................. | 398/5 |
| 8,774,640 B2 * | 7/2014 | Xiao et al. ...................... | 398/140 |
| 2007/0076769 A1 * | 4/2007 | Zou ................................ | 370/539 |
| 2011/0170864 A1 | 7/2011 | Tani et al. | |
| 2012/0002965 A1 * | 1/2012 | Bellato et al. ................... | 398/52 |
| 2012/0014270 A1 | 1/2012 | Honma et al. | |

(Continued)

OTHER PUBLICATIONS

International Telecommunications Union, "Characteristics of optical transport network hierarchy equipment functional blocks," ITU-T Recommendation G.798, Telecommunication Standardization Sector of ITU, 397 pages, Dec. 2012.

(Continued)

*Primary Examiner* — Rasheed Gidado
(74) *Attorney, Agent, or Firm* — Dennis R. Haszko

(57) ABSTRACT

A method and apparatus are provided for multiplexing one or more Low-Order (LO) ODUj/ODUflex clients into a High-Order (HO) ODUk in an Optical Transport Network (OTN). LO bytes are multiplexed in accordance with a tributary slot assignment for a selected LO ODUj of the HO ODUk stream using a permutation matrix. In an implementation, each byte on each ingress port of a W-port space-time-space switch is configurably assigned to an associated timeslot of an associated egress port, using time-division multiplexing. The number of TribSlots assigned to an ODUflex may be increased and decreased hitlessly. A Clos-like Space-Time-Space switch is used to interleave bytes from Low-Order ODUk words into High-Order ODUk words.

12 Claims, 24 Drawing Sheets

(56) References Cited

U.S. PATENT DOCUMENTS

2012/0170936 A1* 7/2012 Vissers et al. .................. 398/58
2013/0004169 A1* 1/2013 Mohamad et al. .............. 398/45
2013/0315592 A1* 11/2013 Sharma et al. .................. 398/58

OTHER PUBLICATIONS

International Telecommunications Union, "Interfaces for the Optical Transport Network (OTN)," ITU-T Recommendation G.709/Y.1331, Telecommunication Standardization Sector of ITU, 232 pages, Feb. 2012.

International Telecommunications Union, "Hitless Adjustment of ODUflex (GFP) (HAO)," ITU-T Recommendation G.7044/Y1347, Telecommunication Standardization Sector of ITU, 32 pages, Oct. 2011.

International Telecommunications Union, "Transport of IEEE 10GBASE-R in optical transport networks (OTN)," Supplement 43 to ITU-T G-series Recommendation, Telecommunication Standardization Sector of ITU, 27 pages, Feb. 2011.

* cited by examiner

| MFAS (678) | MF Row | Frame Row | 1 | ... | 15 | 16 | PL Row 17 → 1 |
|---|---|---|---|---|---|---|---|
| "000" | 1 | 1 | | | TS0H A | TS1 A 1.25G | A1 |
| | 2 | 2 | | | | | A476 |
| | 3 | 3 | | | | | A951 |
| | 4 | 4 | | | | | A1426 |
| "001" | 5 | 1 | | | TS0H B | TS2 B 1.25G | A1901 |
| | 6 | 2 | | | | | A2376 |
| | 7 | 3 | | | | | A2851 |
| | 8 | 4 | | | | | A3326 |
| "010" | 9 | 1 | | | TS0H | TS2 C 1.25G | A3801 |
| | 10 | 2 | | | | | A4276 |
| | 11 | 3 | | | | | A4751 |
| | 12 | 4 | | | | | A5226 |
| "011" | 13 | 1 | | | TS0H | TS4 C 1.25G | A5701 |
| | 14 | 2 | | | | | A6176 |
| | 15 | 3 | | | | | A6651 |
| | 16 | 4 | | | | | A7126 |
| "100" | 17 | 1 | | | TS0H B | TS5 B 1.25G | A7601 |
| | 18 | 2 | | | | | A8076 |
| | 19 | 3 | | | | | A8551 |
| | 20 | 4 | | | | | A9026 |
| "101" | 21 | 1 | | | TS0H | TS2 C 1.25G | A9501 |
| | 22 | 2 | | | | | A9976 |
| | 23 | 3 | | | | | A10451 |
| | 24 | 4 | | | | | A10926 |
| "110" | 25 | 1 | | | TS0H | TS7 C 1.25G | A11401 |
| | 26 | 2 | | | | | A11876 |
| | 27 | 3 | | | | | A12351 |
| | 28 | 4 | | | | | A12826 |
| "111" | 29 | 1 | | | TS0H C | TS8 C 1.25G | A13301 |
| | 30 | 2 | | | | | A13776 |
| | 31 | 3 | | | | | A14251 |
| | 32 | 4 | | | | | A14726 |

FIG. 3A

| 2 | 3 | 4 | 5 | 6 | 7 | 8 | |
|---|---|---|---|---|---|---|---|
| 18 | 19 | 20 | 21 | 22 | 23 | 24 | |
| B1 | C1 | C2 | B2 | C3 | C4 | C5 | |
| B953 | C2381 | C2382 | B954 | C2383 | C2384 | C2385 | |
| B1905 | C4761 | C4762 | B1906 | C4763 | C4764 | C4765 | |
| B2857 | C7141 | C7142 | B2858 | C7143 | C7144 | C7145 | |
| B3809 | C9521 | C9522 | B3810 | C9523 | C9524 | C9525 | |
| B4761 | C11901 | C11902 | B4762 | C11903 | C11904 | C11905 | |
| B5713 | C14281 | C14282 | B5714 | C14283 | C14284 | C14285 | |
| B6665 | C16661 | C16662 | B6666 | C16663 | C16664 | C16665 | |
| B7617 | C19041 | C19042 | B7618 | C19043 | C19044 | C19045 | |
| B8569 | C21421 | C21422 | B8570 | C21423 | C21424 | C21425 | |
| B9521 | C23801 | C23802 | B9522 | C23803 | C23804 | C23805 | |
| B10473 | C26181 | C26182 | B10474 | C26183 | C26184 | C26185 | |
| B11425 | C28561 | C28562 | B11426 | C28563 | C28564 | C28565 | |
| B12377 | C30941 | C30942 | B12378 | C30943 | C30944 | C30945 | |
| B13329 | C33321 | C33322 | B13330 | C33323 | C33324 | C33325 | |
| B14281 | C35701 | C35702 | B14282 | C35703 | C35704 | C35705 | |
| B15233 | C38081 | C38082 | B15234 | C38083 | C38084 | C38085 | |
| B16185 | C40461 | C40462 | B16186 | C40463 | C40464 | C40465 | |
| B17137 | C42841 | C42842 | B17138 | C42843 | C42844 | C42845 | |
| B18089 | C45221 | C45222 | B18090 | C45223 | C45224 | C45225 | |
| B19041 | C47601 | C47602 | B19042 | C47603 | C47604 | C47605 | |
| B19993 | C49981 | C49982 | B19994 | C49983 | C49984 | C49985 | |
| B20945 | C52361 | C52362 | B20946 | C52363 | C52364 | C52365 | |
| B21897 | C54741 | C54742 | B21898 | C54743 | C54744 | C54745 | |
| B22849 | C57121 | C57122 | B22850 | C57123 | C57124 | C57125 | |
| B23801 | C59501 | C59502 | B23802 | C59503 | C59504 | C59505 | |
| B24753 | C61881 | C61882 | B24754 | C61883 | C61884 | C61885 | |
| B25705 | C64261 | C64262 | B25706 | C64263 | C64264 | C64265 | |
| B26657 | C66641 | C66642 | B26658 | C66643 | C66644 | C66645 | |
| B27609 | C69021 | C69022 | B27610 | C69023 | C69024 | C69025 | |
| B28561 | C71401 | C71402 | B28562 | C71403 | C71404 | C71405 | |
| B29513 | C73781 | C73782 | B29514 | C73783 | C73784 | C73785 | |

FIG. 3B

| | 1 | 2 | 3 | 4 | 5 | 6 | 7 | 8 |
|---|---|---|---|---|---|---|---|---|
| | A1(1) | A2(1) | A3(1) | A4(1) | A5(1) | A6(1) | A7(1) | A8(1) |
| | A477(1) | A478(1) | A479(1) | A480(1) | A481(1) | A482(1) | A483(1) | A484(1) |
| | A953(1) | A954(1) | A955(1) | A956(1) | A957(1) | A958(1) | A959(1) | A960(1) |
| | A1429(1) | A1430(1) | A1431(1) | A1432(1) | A1433(1) | A1434(1) | A1435(1) | A1436(1) |
| | ... | | | | | | | ... |
| | A13329(1) | A13330(1) | A13331(1) | A13332(1) | A13333(1) | A13334(1) | A13335(1) | A13336(1) |
| | A13805(1) | A13806(1) | A13807(1) | A13808(1) | A13809(1) | A13810(1) | A13811(1) | A13812(1) |
| | A14281(1) | A14282(1) | A14283(1) | A14284(1) | A14285(1) | A14286(1) | A14287(1) | A14288(1) |
| | A14757(1) | A14758(1) | A14759(1) | A14760(1) | A14761(1) | A14762(1) | A14763(1) | A14764(1) |

FIG. 4

| | 1 | 2 | 3 | 4 | 5 | 6 | 7 | 8 | |
|---|---|---|---|---|---|---|---|---|---|
| | B1(1) | B1(2) | B2(1) | B2(2) | B3(1) | B3(2) | B4(1) | B4(2) | ⋮ |
| | B477(1) | B477(2) | B478(1) | B478(2) | B475(1) | B479(2) | B480(1) | B480(2) | ⋮ |
| | B953(1) | B953(2) | B954(1) | B954(2) | B955(1) | B955(2) | B956(1) | B956(2) | ⋮ |
| | B1429(1) | B1429(2) | B1430(1) | B1430(2) | B1431(1) | B1431(2) | B1432(1) | B1432(2) | ⋮ |
| | ⋮ | | | | | | | | |
| | B13329(1) | B13329(2) | B13330(1) | B13330(2) | B13331(1) | B13331(2) | B13332(1) | B13332(2) | |
| | B13805(1) | B13805(2) | B13806(1) | B13806(2) | B13807(1) | B13807(2) | B13809(1) | B13809(2) | |
| | B14281(1) | B14281(2) | B14282(1) | B14282(2) | B14283(1) | B14283(2) | B14284(1) | B14284(2) | |
| | B14757(1) | B14757(2) | B14758(1) | B14758(2) | B14759(1) | B14759(2) | B14760(1) | B14760(2) | |

FIG. 5

| | 1 | 2 | 3 | 4 | 5 | 6 | 7 | 8 |
|---|---|---|---|---|---|---|---|---|
| | C1(1) | C1(2) | C1(3) | C1(4) | C1(5) | C2(1) | C2(2) | C2(3) |
| | C477(1) | C477(2) | C477(3) | C477(4) | C477(5) | C478(1) | C478(2) | C478(3) |
| | C953(1) | C953(2) | C953(3) | C953(4) | C953(5) | C954(1) | C954(2) | C954(3) |
| | C1429(1) | C1429(2) | C1429(3) | C1429(4) | C1429(5) | C1430(1) | C1430(2) | C1430(3) |
| | ... | | | ... | | | | ... |
| | C13329(1) | C13329(2) | C13329(3) | C13329(4) | C13329(5) | C13330(1) | C13330(2) | C13330(3) |
| | C13805(1) | C13805(2) | C13805(3) | C13805(4) | C13805(5) | C13806(1) | C13806(2) | C13806(3) |
| | C14281(1) | C14281(2) | C14281(3) | C14281(4) | C14281(5) | C14282(1) | C14282(2) | C14282(3) |
| | C14757(1) | C14757(2) | C14757(3) | C14757(4) | C14757(5) | C14758(1) | C14758(2) | C14758(3) |

| Cycle | 2536 | 2537 | 2538 | 2539 | 2540 | 2541 | 2542 | 2543 |
|---|---|---|---|---|---|---|---|---|
| Byte | | | | | | | | |
| 47 | A15217(1) | B15217(1) | C15217(1) | C15226(4) | | | | |
| 46 | A15218(1) | B15217(2) | C15217(2) | C15226(5) | | | | |
| 45 | A15219(1) | B15218(1) | C15217(3) | C15227(1) | | | | |
| 44 | A15220(1) | B15218(2) | C15217(4) | C15227(2) | | | | |
| 43 | A15221(1) | B15219(1) | C15217(5) | C15227(3) | | | | |
| 42 | A15222(1) | B15219(2) | C15218(1) | C15227(4) | | | | |
| 41 | A15223(1) | B15220(2) | C15218(2) | C15227(5) | | | | |
| 40 | A15224(1) | B15220(1) | C15218(3) | C15228(1) | | | | |
| 39 | A15225(1) | B15221(2) | C15218(4) | C15228(2) | | | | |
| 38 | A15226(1) | B15221(1) | C15218(5) | C15228(3) | | | | |
| 37 | A15227(1) | B15222(1) | C15219(1) | C15228(4) | | | | |
| 36 | A15228(1) | B15222(2) | C15219(2) | C15228(5) | | | | |
| 35 | A15229(1) | B15223(1) | C15219(3) | C15229(1) | | | | |
| 34 | A15230(1) | B15223(2) | C15219(4) | C15229(2) | | | | |
| 33 | A15231(1) | B15224(1) | C15219(5) | C15229(3) | | | | |
| 32 | A15232(1) | B15224(1) | C15220(1) | C15229(4) | | | | |
| 31 | | B15225(2) | C15220(2) | C15229(5) | | | | |
| 30 | | B15225(1) | C15220(3) | C15230(1) | | | | |
| 29 | | B15226(2) | C15220(4) | C15230(2) | | | | |
| 28 | | B15226(1) | C15220(5) | C15230(3) | | | | |
| 27 | | B15227(1) | C15221(1) | C15230(4) | | | | |
| 26 | | B15227(2) | C15221(2) | C15230(5) | | | | |
| 25 | | B15228(1) | C15221(3) | C15231(1) | | | | |
| 24 | | B15228(2) | C15221(4) | C15231(2) | | | | |
| 23 | | B15229(1) | C15221(5) | C15231(3) | | | | |
| 22 | | B15229(1) | C15222(1) | C15231(4) | | | | |
| 21 | | B15230(2) | C15222(2) | C15231(5) | | | | |
| 20 | | B15230(1) | C15222(3) | C15232(1) | | | | |
| 19 | | B15231(2) | C15222(4) | C15232(2) | | | | |
| 18 | | B15231(1) | C15222(5) | C15232(3) | | | | |
| 17 | | B15232(1) | C15223(1) | C15232(4) | | | | |
| 16 | | B15232(2) | C15223(2) | C15232(5) | | | | |
| 15 | | | C15223(3) | | | | | |
| 14 | | | C15223(4) | | | | | |
| 13 | | | C15223(5) | | | | | |
| 12 | | | C15224(1) | | | | | |
| 11 | | | C15224(2) | | | | | |
| 10 | | | C15224(3) | | | | | |
| 9 | | | C15224(4) | | | | | |
| 8 | | | C15224(5) | | | | | |
| 7 | | | C15225(1) | | | | | |
| 6 | | | C15225(2) | | | | | |
| 5 | | | C15225(3) | | | | | |
| 4 | | | C15225(4) | | | | | |
| 3 | | | C15225(5) | | | | | |
| 2 | | | C15226(1) | | | | | |
| 1 | | | C15226(2) | | | | | |
| 0 | | | C15226(3) | | | | | |

FIG. 12

| Address RAM | 0 | 1 | 2 | 3 | 4 | 5 | 6 | 7 |
|---|---|---|---|---|---|---|---|---|
| 94 | | | | | | | | |
| 93 | | | | | | | C30(4),4 | |
| 92 | | | | | | | C30(3),4 | |
| 91 | | | | | | | C30(2),4 | |
| 90 | | | | | | | C30(1),4 | |
| 89 | | | | | | | C29(5),4 | |
| 88 | | | | C16(2),2 | B45(1),7 | | | C45(3),7 |
| 87 | | | | C16(1),2 | B44(2),7 | | | C45(2),7 |
| 86 | | | | C15(5),2 | B44(1),7 | | | C45(1),7 |
| 85 | | | | C15(3),2 | B43(2),7 | | | C45(5),7 |
| 84 | | | | C15(2),2 | B43(1),7 | | | C45(4),7 |
| 83 | | | | C15(1),2 | B42(2),6 | C29(4),4 | | C45(3),7 |
| 82 | | | | C14(4),2 | B42(1),6 | C29(3),4 | | C44(2),7 |
| 81 | | | | C14(3),2 | B41(2),6 | C29(2),4 | | C44(1),7 |
| 80 | | | | C14(2),2 | B41(1),6 | C29(1),4 | | C44(5),7 |
| 79 | | | | C14(1),2 | B40(2),6 | C28(5),4 | | C44(4),7 |
| 78 | | | | C13(5),2 | B40(1),6 | C28(4),4 | | C44(3),7 |
| 77 | | | | C13(4),2 | B39(2),6 | C28(3),4 | | C43(2),7 |
| 76 | | | | C13(3),2 | B39(1),6 | C28(2),4 | | C43(1),7 |
| 75 | | | | C13(2),2 | B38(2),6 | C28(1),4 | | C43(5),7 |
| 74 | | | | C13(1),2 | B38(1),6 | C27(5),4 | | C43(4),7 |
| 73 | | | | C12(5),2 | B37(2),6 | C27(4),4 | | C43(3),7 |
| 72 | | | | C12(4),1 | B37(1),6 | C27(3),4 | | C42(2),7 |
| 71 | | | | C12(3),1 | B36(2),5 | C27(2),4 | | C42(1),7 |
| 70 | | | | C12(2),1 | B36(1),5 | C27(1),4 | | C42(5),6 |
| 69 | | | | C12(1),1 | B35(2),5 | C26(5),4 | | C42(4),6 |
| 68 | | | | C11(5),1 | B35(1),5 | C26(4),4 | | C42(3),6 |
| 67 | | | | C11(4),1 | B34(2),5 | C26(3),4 | | C42(2),6 |
| 66 | | | | C11(3),1 | B34(1),5 | C26(2),4 | | C42(1),6 |
| 65 | | | | C11(2),1 | B33(2),5 | C26(1),4 | | C41(5),6 |
| 64 | | | C10(3),1 | C11(1),1 | B33(1),5 | C25(5),4 | | C41(4),6 |
| 63 | | | C10(2),1 | C10(5),1 | B32(2),5 | C25(4),4 | | C41(3),6 |
| 62 | | | C10(1),1 | C10(4),1 | B32(1),5 | C25(3),4 | | C41(2),6 |
| 61 | | | C9(5),1 | | B31(2),5 | C25(2),4 | | C41(1),6 |
| 60 | | | C9(4),1 | | B31(1),5 | C25(1),4 | | C40(5),6 |
| 59 | | | C9(3),1 | | B30(2),4 | C24(5),3 | | C40(4),6 |
| 58 | | | C9(2),1 | | B30(1),4 | C24(4),3 | | C40(3),6 |
| 57 | | | C9(1),1 | | B29(2),4 | C24(3),3 | | C40(2),6 |
| 56 | | | C8(5),1 | | B29(1),4 | C24(2),3 | | C40(1),6 |
| 55 | | | C8(4),1 | | B28(2),4 | C24(1),3 | | C39(5),6 |
| 54 | | | C8(3),1 | | B28(1),4 | C23(5),3 | | C39(4),6 |
| 53 | | | C8(2),1 | | B27(2),4 | C23(4),3 | | C39(3),6 |
| 52 | | B24(2),3 | C8(1),1 | | B27(1),4 | C23(3),3 | C38(2),6 | |
| 51 | | B23(2),3 | C7(5),1 | | B26(2),4 | C23(2),3 | C38(1),6 | |
| | | | C7(4),1 | | B26(1),4 | C23(1),3 | C38(5),6 | |
| | | | | | B25(2),4 | C22(5),3 | | |
| | | | | | B25(1),4 | C22(4),3 | | |

| Address RAM | 0 | 1 | 2 | 3 | 4 | 5 | 6 | 7 |
|---|---|---|---|---|---|---|---|---|
| 94 | | | | | | | C15230(4).4 | |
| 93 | | | | | | | C15230(3).4 | |
| 92 | | | | | | | C15230(2).4 | |
| 91 | | | | | | | C15230(1).4 | |
| 90 | | | | | | | C15229(5).4 | |
| 89 | | | | C15215(2).2 | a | C15229(4).4 | | c |
| 88 | | | | C15215(1).2 | a | C15229(3).4 | | c |
| 87 | | | | C15214(5).2 | a | C15229(2).4 | | c |
| 86 | | | | C15214(4).2 | a | C15228(5).4 | | c |
| 85 | | | | C15214(3).2 | a | C15228(4).4 | | c |
| 84 | | | | C15214(2).2 | a | C15228(3).4 | | c |
| 83 | | | | C15214(1).2 | a | C15228(2).4 | | c |
| 82 | | | | C15213(5).2 | a | C15227(5).4 | | c |
| 81 | | | | C15213(4).2 | a | C15227(4).4 | | c |
| 80 | | | | C15213(3).2 | a | C15227(3).4 | | c |
| 79 | | | | C15213(2).2 | a | C15227(2).4 | | c |
| 78 | | | | C15213(1).2 | a | C15227(1).4 | | c |
| 77 | | | | C15212(5).1 | a | C15226(5).4 | | c |
| 76 | | | | C15212(4).1 | a | C15226(4).4 | | c |
| 75 | | | | C15212(3).1 | a | C15226(3).4 | | c |
| 74 | | | | C15212(2).1 | a | C15226(2).4 | | c |
| 73 | | | | C15212(1).1 | a | C15226(1).4 | | c |
| 72 | | | | C15211(5).1 | a | C15225(5).4 | | c |
| 71 | | | | C15211(4).1 | a | C15225(4).4 | | c |
| 70 | | | | C15211(3).1 | a | C15225(3).4 | | c |
| 69 | | | | C15211(2).1 | B15232(2).5 | C15225(2).4 | | c |
| 68 | | | | C15211(1).1 | B15232(1).5 | | | c |
| 67 | | | | C15210(5).1 | B15231(2).5 | | | c |

FIG. 15C

MULTIPLEXING LOW-ORDER TO HIGH-ORDER ODU SIGNALS IN AN OPTICAL TRANSPORT NETWORK

CROSS REFERENCE TO RELATED APPLICATIONS

This application claims the benefit of priority of U.S. Provisional Patent Application No. 61/704,259 filed Sep. 21, 2012, which is incorporated herein by reference in its entirety.

FIELD

The present disclosure relates generally to optical data communications. More particularly, the present disclosure relates to multiplexing in an optical transport network.

BACKGROUND

Bandwidth demand on telecommunications networks is increasing. In response, the International Telecommunications Union (ITU) has standardized the Optical Transport Network (OTN), which is a dense wavelength division multiplexing (DWDM) network. The rates and formats of OTN constructs such as optical channel transport unit (OTU)k and optical channel data unit (ODU)k are defined in ITU-T G.709.

ITU-T G.709 has a defined number of ODUk frames; k=0, 1, 2, 2e, 3 and 4, in order of increasing rates. A lower rate ODUj can be multiplexed into a higher rate ODUk. Multi-level multiplexing is allowed. For example, eight ODU0 streams may be multiplexed into an ODU2, which may, in turn, be multiplexed along with nine other ODU2 streams, into an ODU4. FIG. 1A and FIG. 1B show an OTN terminating device that supports two levels of multiplexing.

The multiplexing of Low Order (LO) ODUj/ODUflex clients into a High Order (HO) ODUk carrier is performed in two logical steps, Rate Justification and Multiplexing. Rate Justification encodes the rate of each LO ODUj in relation to an optical channel data tributary unit (ODTU) by either AMP (Asynchronous Mapping Procedure) or GMP (Generic Mapping Procedure) as defined in ITU-T G.709. The ODTU streams are phase locked to HO ODUk carrier. Then, the resultant ODTUs are multiplexed into the HO Server Multi-frame of the HO OPUk. An example of multiplexing an ODU0, an ODU1 and an ODUflex.5 is shown in FIG. 2.

The individual LO channels are not frame aligned with the HO channel frame. Each LO channel is mapped in an ODTU which is a rate justified structure that fills the Tributary Slots allotted to the LO channel within the HO ODUk. The first byte of each LO ODTU is aligned with the HO ODUk Tributary Multiframe. Bytes of an ODTU are grouped into M-byte words, where M is the number of TribSlots allocated to the ODTU. For identifying Data vs Stuff words in GMP, words are numbered using an index j. The first word is given j=1.

In a typical 100 Gbps bandwidth device, the datapath width (W) is typically W=32 to W=64 bytes. W is expected to grow for 400 Gbps and 1 Tbps bandwidth devices of the future. The number of Tributary Slots (M) allocated to a LO ODUk in the HO carrier varies. Some ITU-T G.709 values of M are as follows: ODU1: M=2; ODU2: M=8; ODU3: M=32; ODU4: M=80; ODUflex: M=Variable.

FIGS. 3A and 3B show an ODU2 multiframe with three LO channels, an ODU0, ODU1 and ODUflex5. The Tributary Slots in the HO are split into a repeating sequence of LO TS allocated based on rate. ODU0=1 TS (Channel A), ODU1=2 TS (Channel B), and ODUflex5=5 TS (Channel C). The label within each byte shows the channel and the GMP byte count for the first word of each row.

When multiplexing, the ODU overhead is added to the OPU (columns 17-3824) which is formed from the Optical Channel Data Transport Units (ODTU). An ODTU2.1 is shown in FIG. 4 (channel A), ODTU12 in FIG. 5 (channel B) and ODTU2.5 in FIG. 6 (channel C).

LO clients can be added or removed from a HO carrier without affecting any other LO clients. In addition, in ITU-T G.7044, a LO ODUflex Generic Framing Procedure (GFP) channel can be hitlessly resized (up or down) without affecting any other LO clients.

GMP is a generic mapping procedure defined in ITU-T G.709. GMP is used to match the rate of the LO ODUj to the ODTU payload area. The ODTU bytes are then mapped into the OPUk Tributary Slots. Justification Control bytes in the GMP overhead specify the number of M-byte words in each ODTU frame that carry LO ODUj bytes (known as Data Words). The remaining words in the ODTU frame are filled with Stuff Words. The distribution of Data and Stuff words are given by Equations 1 and 2 below.

In Equation 1 and Equation 2, Cm is the number of client Data Words mapped into the payload area of the Server allocated to that client. Each M-byte word is indexed by j, where j=1 to Pm,server M-byte words. Pm,server is the number of words in the ODTU frame. A word is a client Data Word when Equation 1 is satisfied, and is a Stuff Word when Equation 2 is satisfied. An example of how Data and Stuff words may be distributed in an ODTU frame is shown in FIG. 7.

$$\text{client data } (D): \text{if } (j \times C_m) \bmod P_{m,server} < C_m \quad \text{Equation 1}$$

$$\text{stuff } (S): \text{if } (j \times C_m) \bmod P_{m,server} \geq C_m. \quad \text{Equation 2}$$

A known implementation of a multiplexer follows the G.709 definitions directly and is shown in FIGS. 8A and 8B. A set of LO ODU clients are delivered over a W-byte datapath in a TDM (time division multiplex) fashion. The incoming data of each LO ODUj is stored in separate FIFOs, shown in FIGS. 8A and 8B as FIFO 1 to FIFO 78. Each of the LO ODU clients is multiplexed into a HO ODUk carrier of M Tributary Slots. Each LO ODU client is allocated M of the T Tributary Slots in the HO Server MF, based on its nominal rate. The LO channel data is rate justified using the Generic Mapping Procedure. The number and position of the justification stuff bytes is calculated with a channelized Time Division Multiplexing GMP engine. The resultant number of data bytes needed and justification pattern is used by the Expander block to expand the data by inserting stuff bytes. The justified data, with width of W bytes, is stored in a separate justified FIFO per LO channel.

At the HO Server side, the TDM databus may carry words from multiple HO ODUk carriers. Each W-byte word contains a certain number of bytes from a set of LO ODU client bytes associated with that HO ODUk carrier. The bytes required are read from the corresponding LO justified FIFOs and then inserted into the correct byte locations of the HO carrier word using the W:1 multiplexers. This implementation is very gate intensive as most elements replicated by the number of potential LO ODU clients. For example, an ODU4 or a set of ten ODU2s can support up to 80 LO ODU0 clients.

As line rates go up, the container sizes increase, but the granularity remains the same. A system can now have ODU4 carriers each with 80 Tributary Slots which results in large multiplexing structures with a huge number of potential combinations. The structure requires a large set of multiplexers which need to be configured based on the datapath width (W) and the number of HO Tributary Slots. Further complicating the configuration is the HO Tributary Slot number may not be divisible by the datapath width. The large number of LO TribSlots within the HO may mean that many cycles of the datapath are required before a single HO cycle is ready, resulting in multiple stages of storage.

An implementation should also be flexible to add or remove channels, or do ODUflex hitless resizing. This requires that the justification patterns can be changed on the fly and coordinated between the justification and multiplexing stages. The data that is in FIFOs cannot be corrupted between justification contexts, and more importantly information pertaining to the context must pass through FIFOs.

It is, therefore, desirable to provide an improved method and apparatus for multiplexing low order ODUj clients to a high order ODUk in an OTN.

BRIEF DESCRIPTION OF THE DRAWINGS

Embodiments of the present disclosure will now be described, by way of example only, with reference to the attached Figures.

FIGS. 3A and 3B illustrate an example of TribSlot assignment of LO ODUj clients in an ODU2.

FIG. 4 illustrates an example of ODTU2.1.

FIG. 5 illustrates an example of ODTU12.

FIG. 6 illustrates an example of ODTU2.5.

FIG. 11 illustrates high-order OPUk datapath cycles according to an embodiment of the present disclosure.

FIG. 12 illustrates low-order ODUj/ODUflex client datapath cycles according to an embodiment of the present disclosure.

FIGS. 14A and 14B illustrate an S-T-S switch Buffer in RAM for ODU2 example with W=48 bytes (<CH><J>(byte#).<datapath cycle>) according to an embodiment of the present disclosure.

FIGS. 15A, 15B and 15C illustrate an S-T-S switch Buffer in RAM for ODU2 example with W=48 bytes with padding according to an embodiment of the present disclosure.

DETAILED DESCRIPTION

Figure 1A:
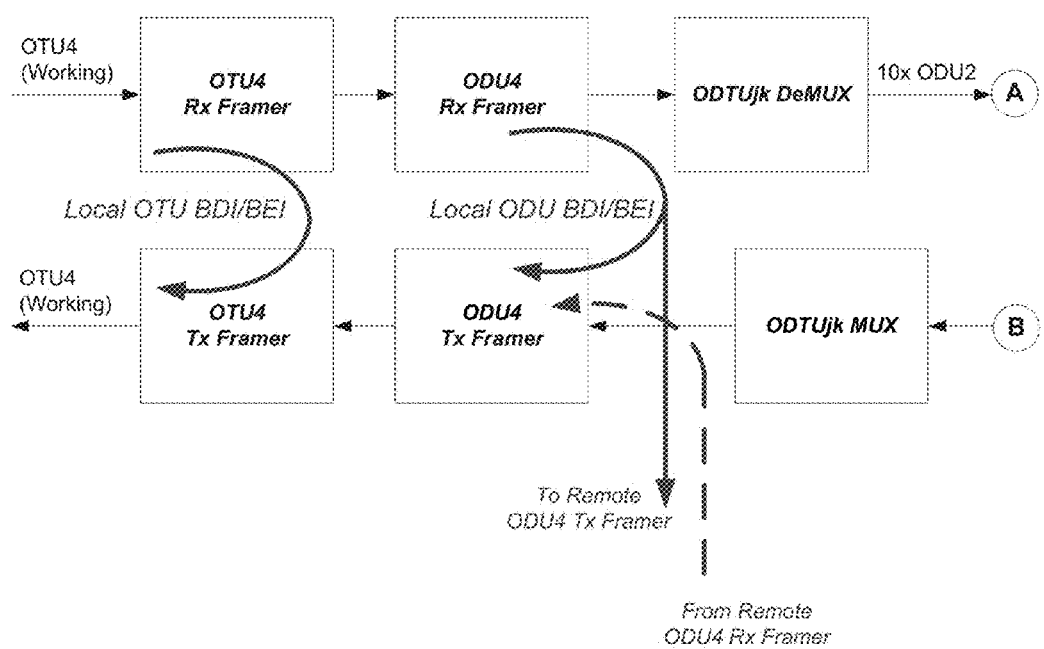
FIGS. 1A and 1B illustrate a typical OTN device with two levels of multiplexing.
Figure 1B:
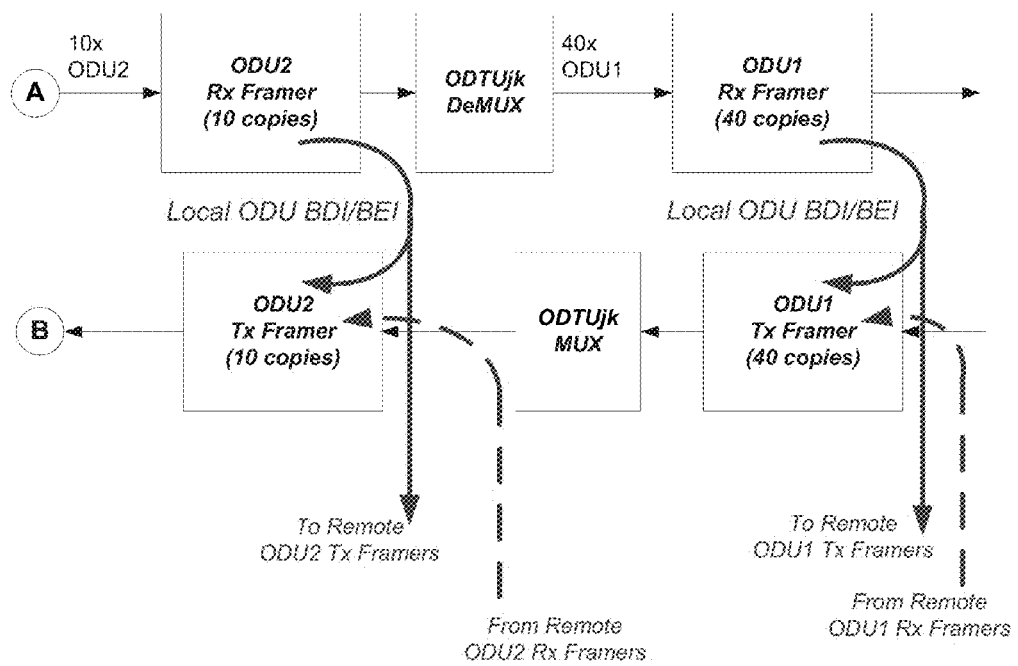
Figure 2:
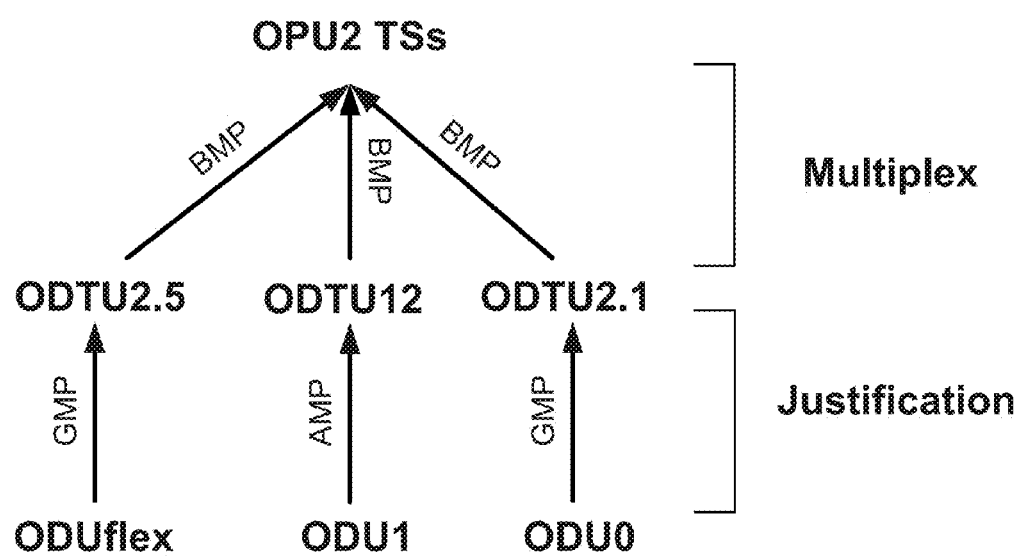
FIG. 2 illustrates an example of multiplexing LO ODUj/ODUflex clients into an ODU2.
Figure 7:
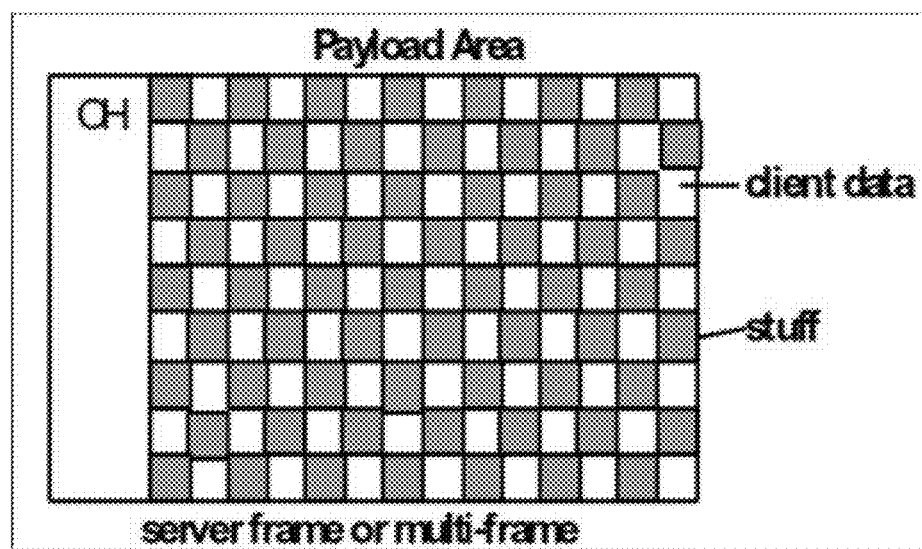
FIG. 7 illustrates distribution of data and stuff words in an ODTU frame.
Figure 8A:
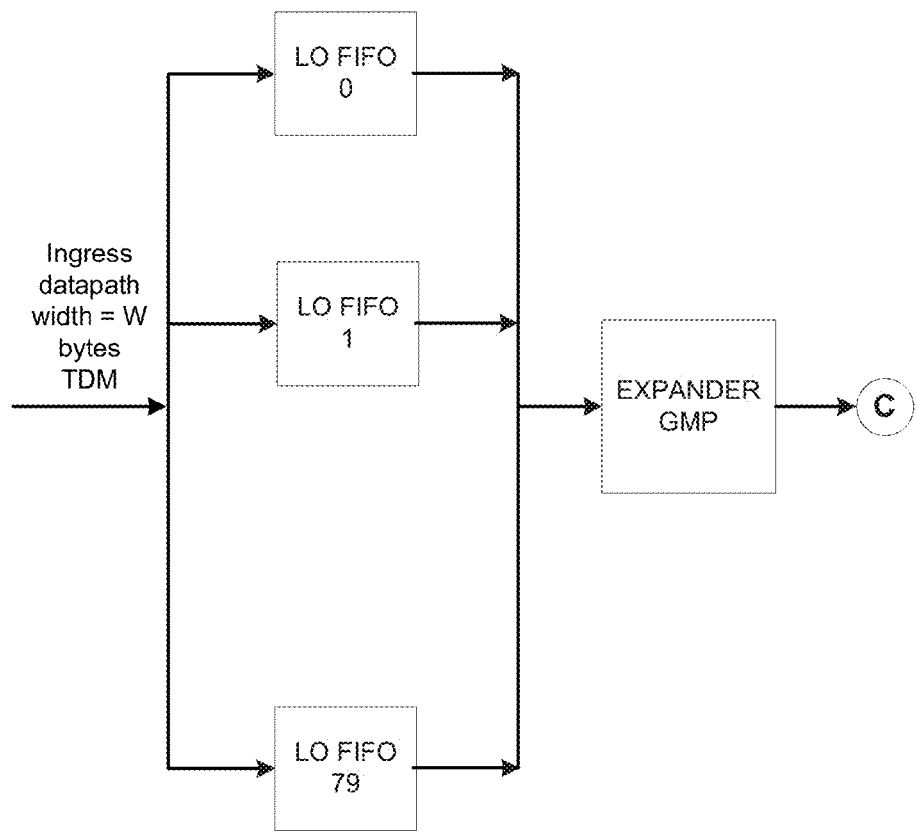
FIGS. 8A and 8B illustrate a known implementation of an ODTUjk multiplexer.
Figure 8B:
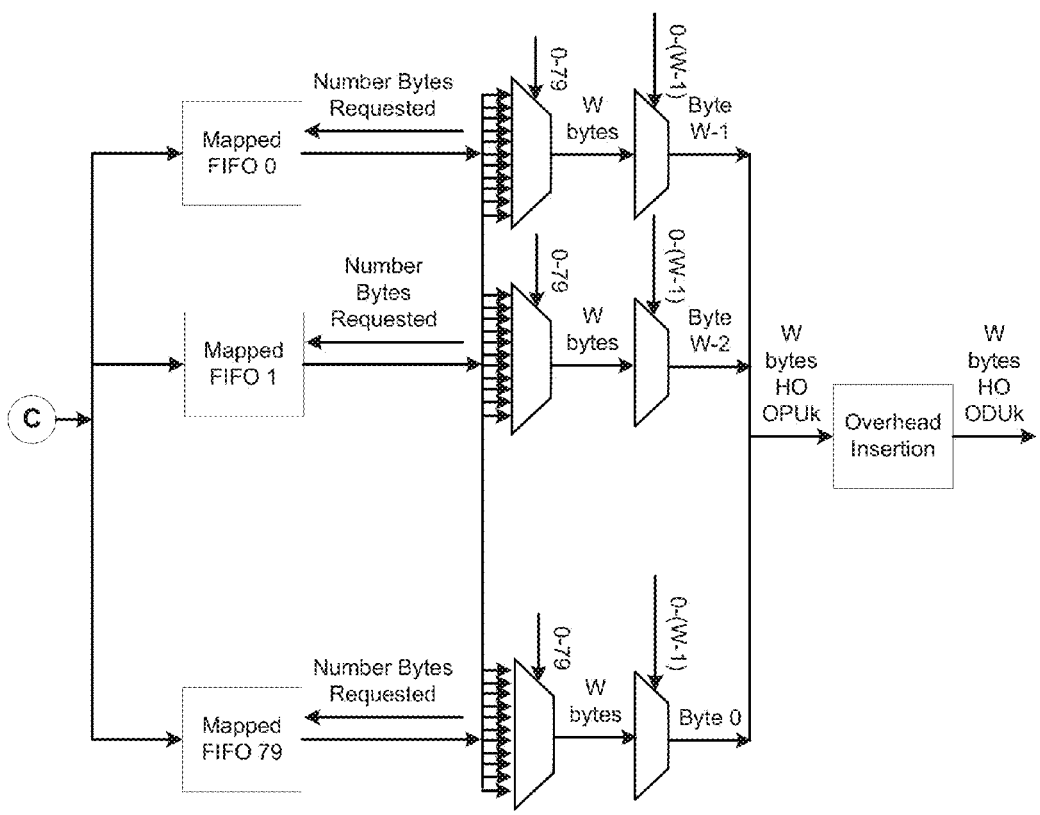

Generally, the present disclosure provides a method and apparatus for multiplexing one or more Low-Order (LO) ODUj/ODUflex clients into a High-Order (HO) ODUk in an Optical Transport Network (OTN). LO bytes are multiplexed in accordance with a tributary slot assignment for a selected LO ODUj of the HO ODUk stream using a permutation matrix. In an implementation, each byte on each ingress port of a W-port space-time-space switch is configurably assigned to an associated timeslot of an associated egress port, using time-division multiplexing. The number of TribSlots assigned to an ODUflex may be increased and decreased hitlessly. A Clos-like Space-Time-Space switch is used to interleave bytes from Low-Order ODUk words into High-Order ODUk words.

In an embodiment, the present disclosure provides a method of multiplexing a plurality of Low-Order (LO) ODUj clients into a High-Order (HO) ODUk in an Optical Transport Network (OTN) comprising: inserting pad words among the plurality of LO ODUj data words, using an expander block, to justify the plurality of LO ODUj data words resulting in an ODTUjk.; and multiplexing and re-arranging bytes in the ODTUJK into HO ODUk words in accordance with a tributary slot assignment for a selected LO ODUj of the HO ODUk stream using a permutation matrix.

In an example embodiment, the method further comprises: configurably assigning each byte on each ingress port of a W-port space-time-space switch to an associated timeslot of an associated egress port.

In an example embodiment, the re-arranged bytes comprise m bytes of the selected LO ODUj client when the selected LO ODUj client occupies m tributary slots in the HO ODUk. In an example embodiment, the plurality of LO ODUj clients comprises LO ODUflex clients.

In an example embodiment, the expander block inserts generic mapping procedure (GMP) pad bytes among GMP data bytes. In an example embodiment, each GMP pad and GMP data word occupies the same number of bytes as the number of HO ODUk tributary slots occupied by the LO ODUj stream.

In an example embodiment, the method further comprises reconfiguring the permutation matrix for additions or removals of LO ODUj/ODUflex clients within the HO ODUk carrier. In an example embodiment, the method further comprises updating a standby page of configuration settings in the permutation matrix with new settings that take effect at a next server multi-frame boundary, ensuring that existing LO ODUj/ODUflex clients are hitless during a change.

In an example embodiment, inserting the pad words comprises inserting end of multiframe (EOMF) padding bytes that complete the final buffer of the permutation matrix for that multiframe, allowing for LO ODUj/ODUflex addition or removal of LO ODUj/ODUflex clients while remaining hitless on other LO ODUj/ODUflex clients.

In another embodiment, the present disclosure provides a system for multiplexing a plurality of Low-Order (LO) ODUj clients into a High-Order (HO) ODUk in an Optical Transport Network (OTN) comprising: an expander block for inserting pad words among the plurality of LO ODUj data words, to justify the plurality of LO ODUj data words to form an ODTUjk for each LO ODUj client; and a space-time-space (STS) switch including a permutation matrix for re-arranging and multiplexing bytes in the ODTUjk data words into HO ODUk words in accordance with a tributary slot assignment for a selected LO ODUj of the HO ODUk stream using, the set of permutation matrices comprising one permutation matrix for each HO ODUk.

In an example embodiment, the STS switch comprises: a plurality of ingress multiplexers and a plurality of egress multiplexers implementing space stages of the STS switch;

and a plurality of random access memories (RAMs) implementing a time stage of the STS switch, the RAMs configured to control the plurality of ingress multiplexers and the plurality of egress multiplexers. In an example embodiment, for a W-byte LO ODUj cycle, a multiplexer selects W of 2*W−1 RAMs to store received LO ODUj data bytes.

In an example embodiment, for each received byte, the STS switch determines an egress word and a byte within the determined egress word on which the received bye will be sent out. In an example embodiment, the STS switch comprises W ports, and configurably assigns each byte on each ingress port of the W-port STS switch to an associated timeslot of an associated egress port.

In an example embodiment, the re-arranged bytes comprise m bytes of the selected LO ODUj client when the selected LO ODUj client occupies m tributary slots in the HO ODUk. In an example embodiment, the plurality of LO ODUj clients comprises LO ODUflex clients. There may be multiple or partial HO ODUk words within the datapath width egress of the STS switch.

In an example embodiment, the expander block inserts generic mapping procedure (GMP) pad bytes among GMP data bytes. In an example embodiment, each GMP pad and GMP data word occupies the same number of bytes as the number of HO ODUk tributary slots occupied by the LO ODUj stream.

In an example embodiment, the STS switch is configured to multiplex the plurality of LO ODUj clients to a plurality of HO ODUks, in which case the STS switch further comprises a set of permutation matrices comprising one permutation matrix for each of the plurality of HO ODUks.

In an example embodiment, the permutation matrix is reconfigurable for additions or removals of LO ODUj/ODUflex clients within the HO ODUk carrier.

In an example embodiment, the system further comprises a standby page of configuration settings in the permutation matrix, the standby page being updated with new settings that take effect at a next server multi-frame boundary, ensuring that existing LO ODUj/ODUflex clients are hitless during a change.

In an example embodiment, the expander block inserts end of multiframe (EOMF) padding bytes that complete the final buffer of the permutation matrix for that multiframe, allowing for LO ODUj/ODUflex clients addition or removal of LO ODUj/ODUflex clients while remaining hitless on other LO ODUj/ODUflex clients.

Other aspects and features of the present disclosure will become apparent to those ordinarily skilled in the art upon review of the following description of specific embodiments in conjunction with the accompanying figures.

An ODUjk MUX according to an embodiment of the present disclosure maps each LO ODUj/ODUflex client into an associated ODTU container using GMP. A related ODTUjk de-multiplexer is described in co-pending and commonly assigned application entitled "DEMULTIPLEXING HIGH-ORDER TO LOW-ORDER ODU SIGNALS IN AN OPTICAL TRANSPORT NETWORK", filed of even date herewith, which is incorporated herein by reference in its entirety. All the ODTU containers to be multiplexed to a common HO ODUk are assigned the same Tributary Multiframe alignment.

An ODUjk MUX according to an embodiment of the present disclosure treats each byte of a W-byte bus carrying the ODTU container of each LO ODUj/ODUflex client as a separate ingress stream to a Space-Time-Space (STS) switch.

In an embodiment, an ODUjuk MUX treats each byte of a W-byte bus carrying the LO ODUj client as a separate egress stream to a Space-Time-Space (STS) switch. The size of the switch grain-group is the number of Tributary Slots allocated to the LO ODUj stream in the HO ODUk as defined in G.709. Each grain of the grain group can be independently configured to switch from an arbitrary STS switch input port to an arbitrary STS output port. Each grain in an ingress grain group can be independently configured to switch to an arbitrary grain of an egress grain group. The switch settings can only change at grain group boundaries. The grain size is one byte. A grain group consists of G bytes. The concept of grain groups is discussed in commonly assigned U.S. Pat. No. 7,492,760 entitled "Memory Egress Self Selection Architecture" issued on Feb. 17, 2009, which is incorporated herein by reference in its entirety.

In an embodiment, an ODUjk MUX maps the problem of multiplexing Low-Order ODUj/ODUflex clients into High-Order ODUk carriers to that of assigning each byte on each ingress port of a W-port STS Switch to an associated timeslot of an associated egress port. The association of ingress bytes and ports to egress timeslots and ports is fully software configurable.

An ODUjk MUX according to an embodiment of the present disclosure comprises a RAM based implementation of the Time component of the Space-Time-Space switch and RAM based implementation for the control of the multiplexers in the Space components of the Space-Time-Space switch.

In an embodiment, Tributary Multiframe alignment of the multiple ODTU containers of the LO Low-Order ODUj/ODUflex clients is slaved to that of their HO ODUk.

Figure 9:
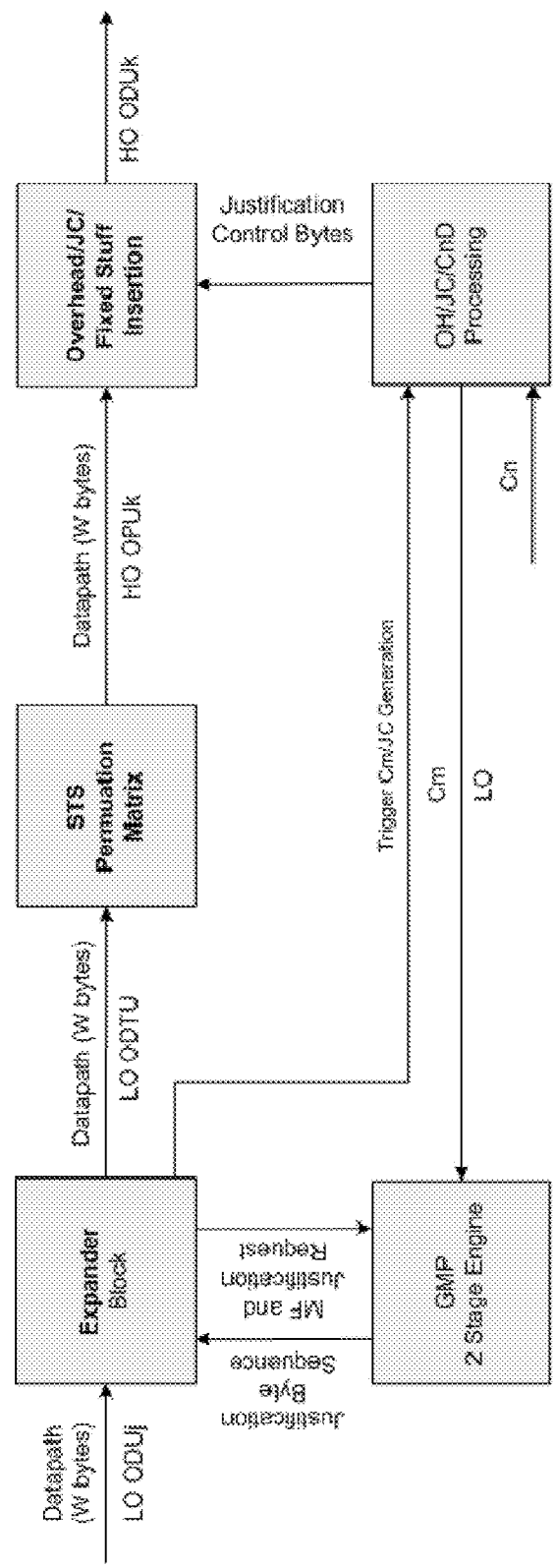
FIG. 9 illustrates an ODTUjk multiplexer according to an embodiment of the present disclosure.

FIG. 9 shows an example embodiment of an ODTUjk multiplexer according to an embodiment of the present disclosure. The multiplexing of Low-Order ODUj/ODUflex clients into High-Order ODUk carriers comprises interleaving the bytes from the LO ODUj words into the HO ODUk words. In an embodiment, this comprises a set of Permutation Matrices, one for each HO ODUk.

Figure 10:
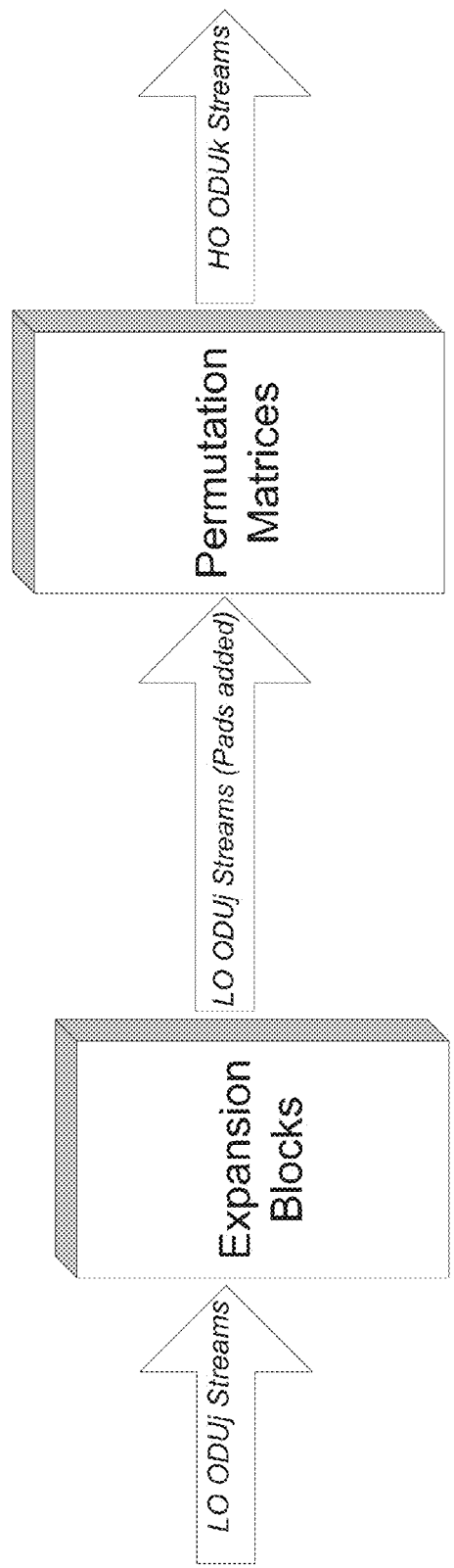
FIG. 10 illustrates an ODTU multiplexer and justification removal flow according to an embodiment of the present disclosure.

FIG. 10 illustrates an ODTU multiplexer and justification insertion flow according to an embodiment of the present disclosure. An implementation of the justification removal is described in co-pending and commonly assigned application entitled "JUSTIFICATION INSERTION AND REMOVAL IN GENERIC MAPPING PROCEDURE IN AN OPTICAL TRANSPORT NETWORK", filed of even date herewith, which is incorporated herein by reference in its entirety.

It can be shown that for a HO ODUk with T Tributary Slots, a block of T OPUk words (excluding Overhead, Fixed Stuff bytes) will contain an integer number of words of each constituent LO ODUj stream. That is, if LO ODUj #1 occupied $T_1$ TribSlots, LO ODUj #2 occupied $T_2$ TribSlots, etc, a block of $T=T_1+T_2+\ldots$ HO ODUk words will contain $T_1$ words of ODUj #1, $T_2$ words of ODUj #2, etc. This result is independent of datapath width (W). The Permutation Matrix is used to arrange a block of W×T bytes in arbitrary order. It is also known that a Clos Time-Space-Time switch, or its dual a Space-Time-Space switch, is able to arbitrarily switch the grains of N ingress streams, each with a grain-group length of G bytes, onto N egress stream.

Advantageously, in an ODTU Multiplexer, $T_1$ words of ODUj #1, $T_2$ words of ODUj #2, etc can be grouped together to form a block to T words. $T_n$ is the number of Tributary Slots allocated to the associated LO ODUj. Each byte of the ingress LO ODUj words can be separated into W ingress streams. Each such stream has a grain-group length of T which matches the number of Tributary Slots in the egress HO ODUk. A Clos switch can be used to implement the Permutation Matrix.

The datapath width (W) may be more or less than the number of Tributary Slots (T). The number of Tributary Slots of various ODUk streams are: ODU1: T=2; ODU2: T=8; ODU3: T=32; ODU4: T=80.

Consider the block of W×T bytes. Each byte is selectable as to which egress word and which byte of that egress word, it will be sent out on. In a Space-Time-Space implementation, each block occupies a range of T addresses in RAM. To be strictly non-blocking for unicast connections, the switch requires a minimum of 2*W−1 RAMs as the Time stage. An ingress block of W×T bytes cannot be read out until it has been completely written into the RAMs. Thus, the RAMs must be deep enough to support 2*T addresses. In practice, to simplify ingress and egress timing domain alignment, the RAMs should be deep enough to support 4*T addresses, though a MUX implementation uses 3*T and DEMUX 4*T. Thus, the 4 slices of addresses can act as a four element FIFO.

Figure 11:
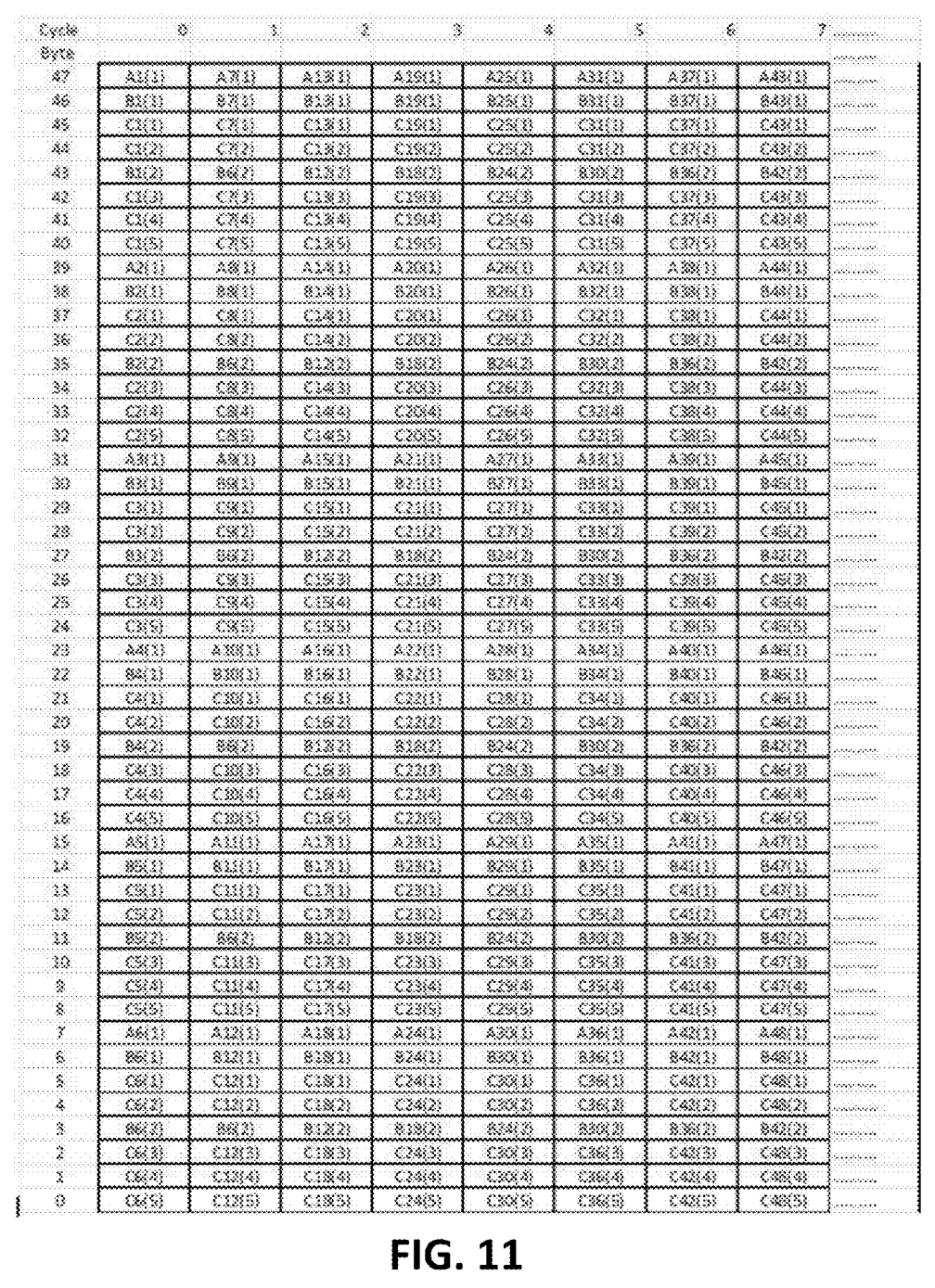

The interleaving only occurs within the High-Order OPUk, and therefore, the overhead rows 1 to 16 must be removed first. FIG. 11 shows the datapath cycles with High-Order OPUk data words. The client words are shown based on j and denoting the byte number within the word.

In the Low-Order to High-Order direction, each LO ODUj cycle, with W bytes of data, needs to configure multiplexers to select which RAM is used to store each of the W bytes. Only W RAMs are written in any given cycle. In an embodiment, the address select for all the RAMs is the same for that cycle. The write Enable for each of the W RAMs must also be set for that cycle, so that only W RAMs are written. In another embodiment, the address select for all the RAMs is software configurable.

Each HO ODUk cycle will read W bytes of data and needs to configure multiplexers accordingly. Each RAM can be read by an independent address as per the Permutation Matrix. A read enable per RAM can be such that only W of the RAMs are read in a given cycle to fill the W egress bytes. The W bytes egress needs a multiplexer select to choose the correct RAM to fill each byte. The RAMs implement the time stage. The ingress and egress multiplexers implement the space stages.

The Permutation Matrix implementation is incredibly complex if done entirely in hardware. This includes the multiplexers and the multiplexer selects, RAM addresses, and RAM R/W enables for each cycle of the HO ODUk or LO ODUj. Hardware generation of these inputs is large, risky and difficult to fully test. According to an embodiment of the present disclosure, firmware creates the configuration for the multiplexer selects, RAM addresses and RAM R/W enables. Firmware runs an algorithm that creates the Permutation Matrix settings based on the HO ODUk Tributary Slot allocation of the LO ODUjs within it. This configuration is based on cycles 1 to T for each HO ODUk carrier and corresponds to the matching LO ODUj/ODUflex clients. The configuration is programmed prior to the HO ODUk carrier activation.

The HO ODUk carrier Permutation Matrix operates on T cycles of W bytes. It buffers T cycles of W bytes from a set of LO ODUj/ODUflex clients. Each buffer is therefore based on a single High-Order carrier. In the LO to HO direction, a buffer cannot be read until it is completely written for all T cycles. For this reason, the Permutation Matrix contains multiple buffers to ensure that no overflow or underflow occurs. These multiple buffers act as a FIFO. The J=1 byte of the client ODTU is aligned to the start of a buffer.

The Permutation Matrix is reconfigured for additions or removals of LO ODUj/ODUflex clients within the HO ODUk carrier. A standby page of configuration settings is updated with the new settings and takes effect at the next Server Multi-frame boundary, ensuring that existing LO ODUj/ODUflex clients are hitless during this change. Each buffer can only contain data from a single HO ODUk multi-frame. The MF boundary starts at an empty buffer and the last buffer, at the end of the MF, is padded out. The amount of padding bytes needed is fixed for a given HO ODUk carrier, number of TribSlots T and databus width W.

The Permutation Matrix settings are reconfigured during G.7044 hitless re-sizing of a LO ODUflex client. The entire HO ODUk carrier must be re-configured and uses a standby configuration that is programmed prior to the change-over (knife's edge). This change-over must also be hitless for all the existing, non-resized LO ODUflex clients. By restricting each buffer to only contain data from a single HO ODUk multi-frame and changing Permutation Matrix settings on multi-frame boundaries, the number of TribSlot allocated to each LO ODUj/ODUflex will be constant within the buffer.

Figure 13A:
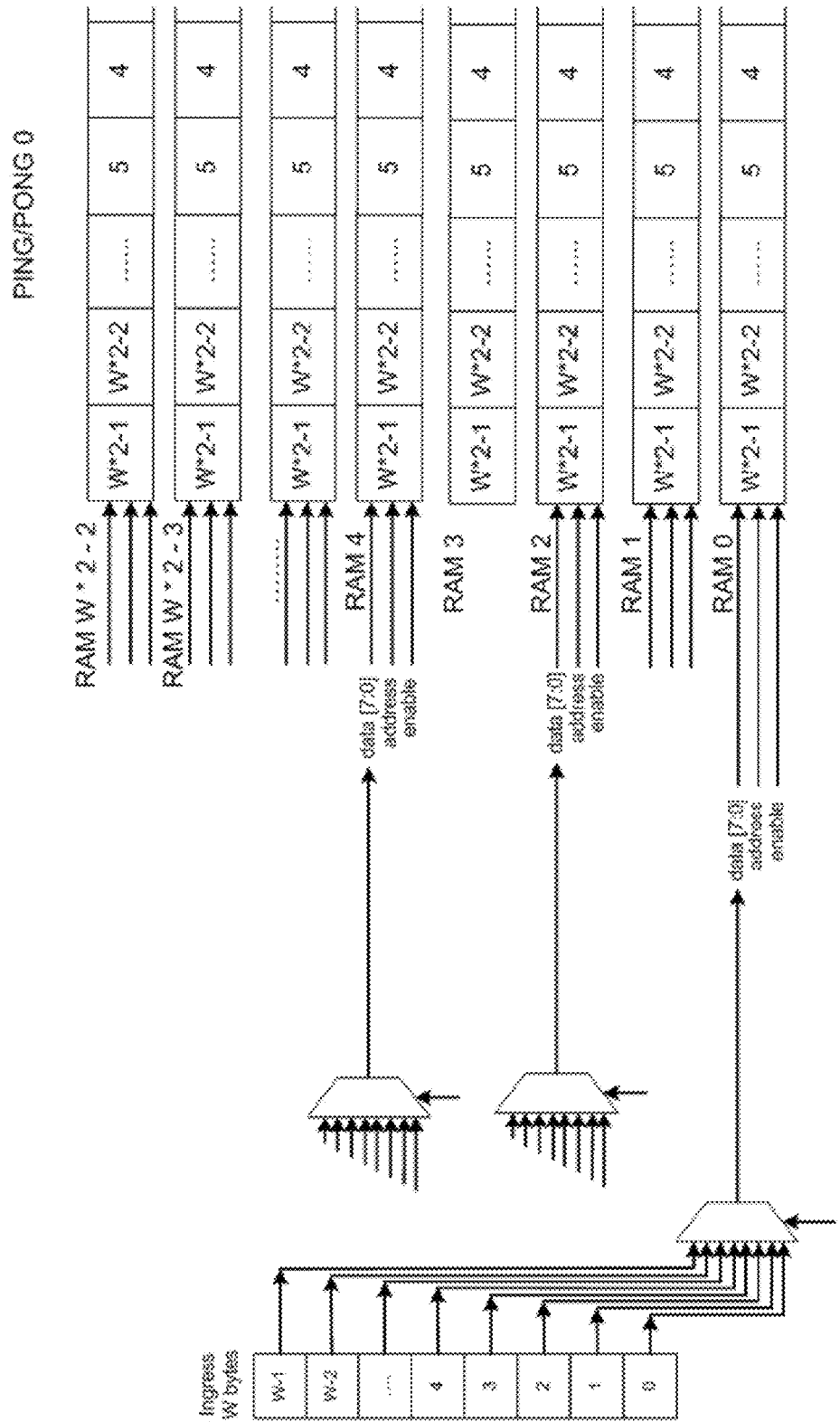
FIGS. 13A and 13B illustrate a multiplexer implementation for an S-T-S switch according to an embodiment of the present disclosure.
Figure 13B:
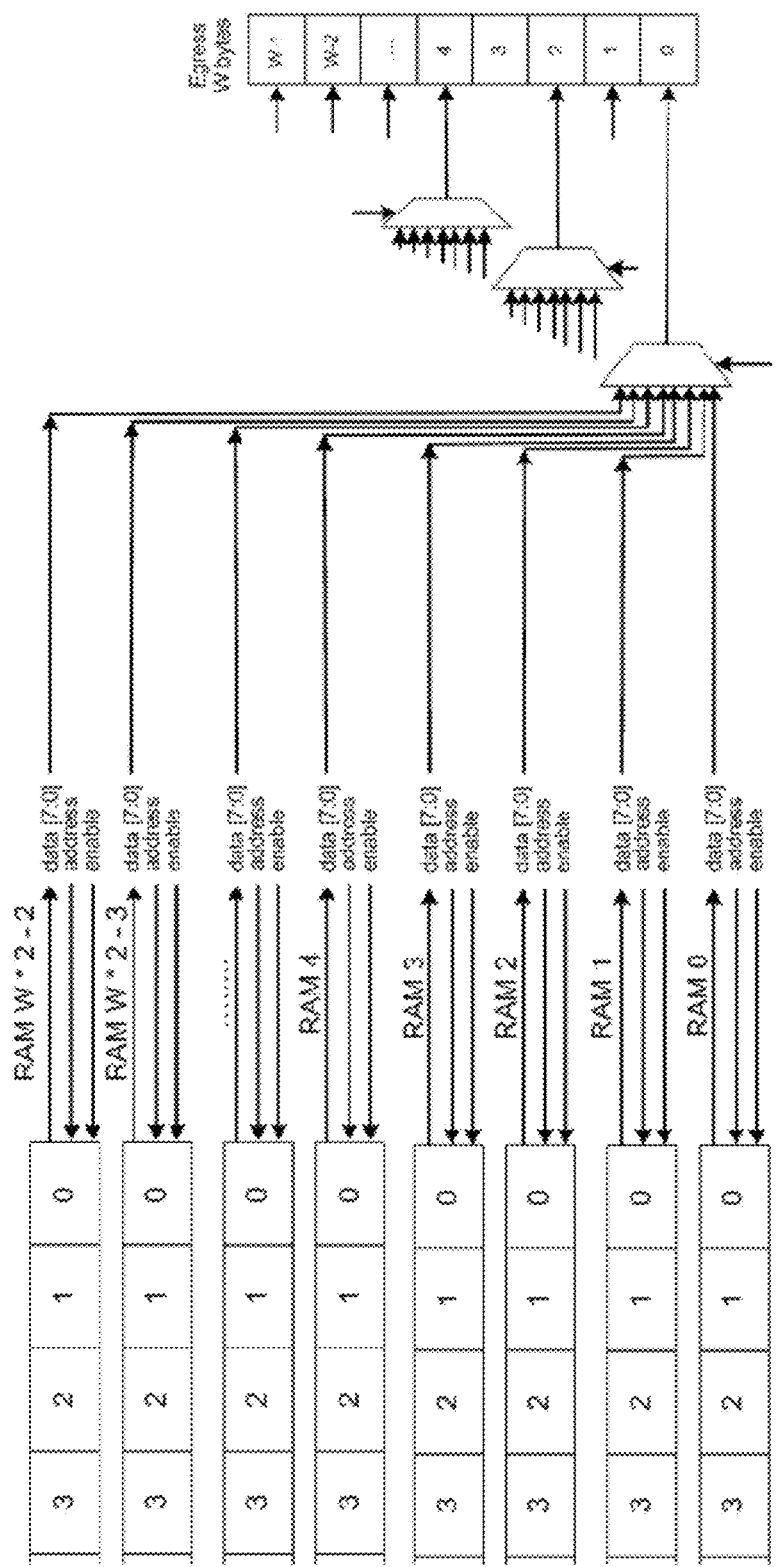
Figure 14B:
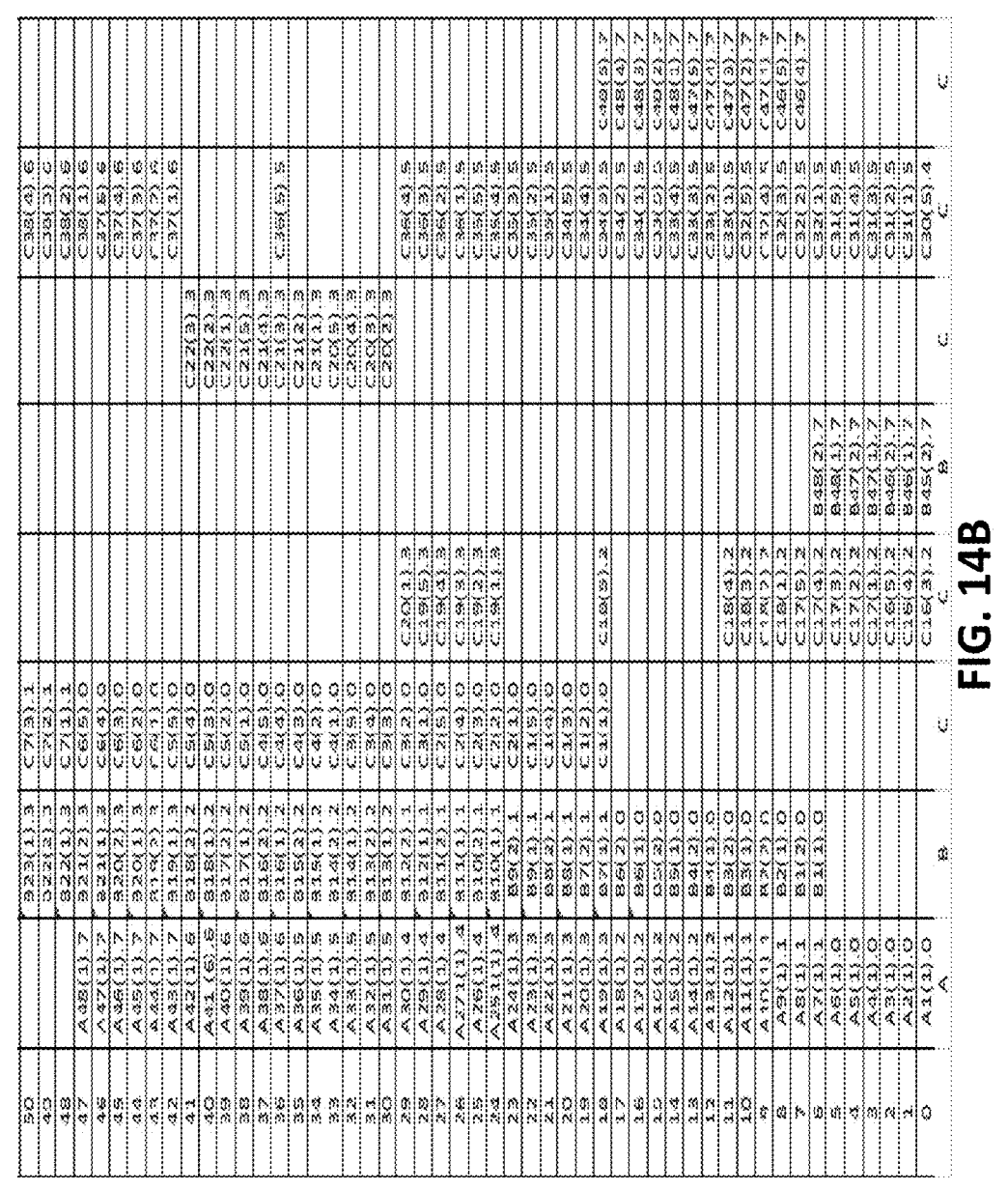
Figure 15A:
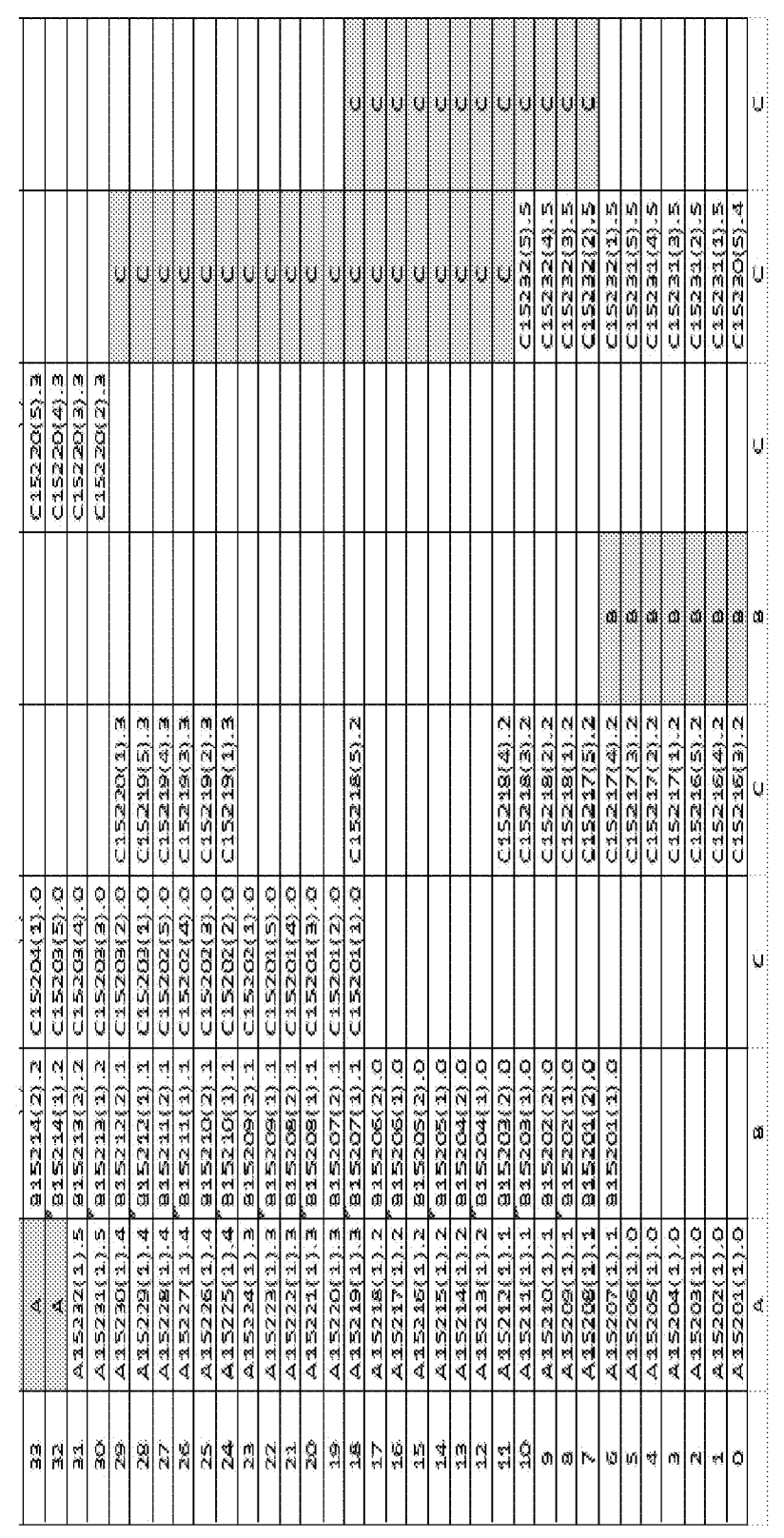
Figure 15B:
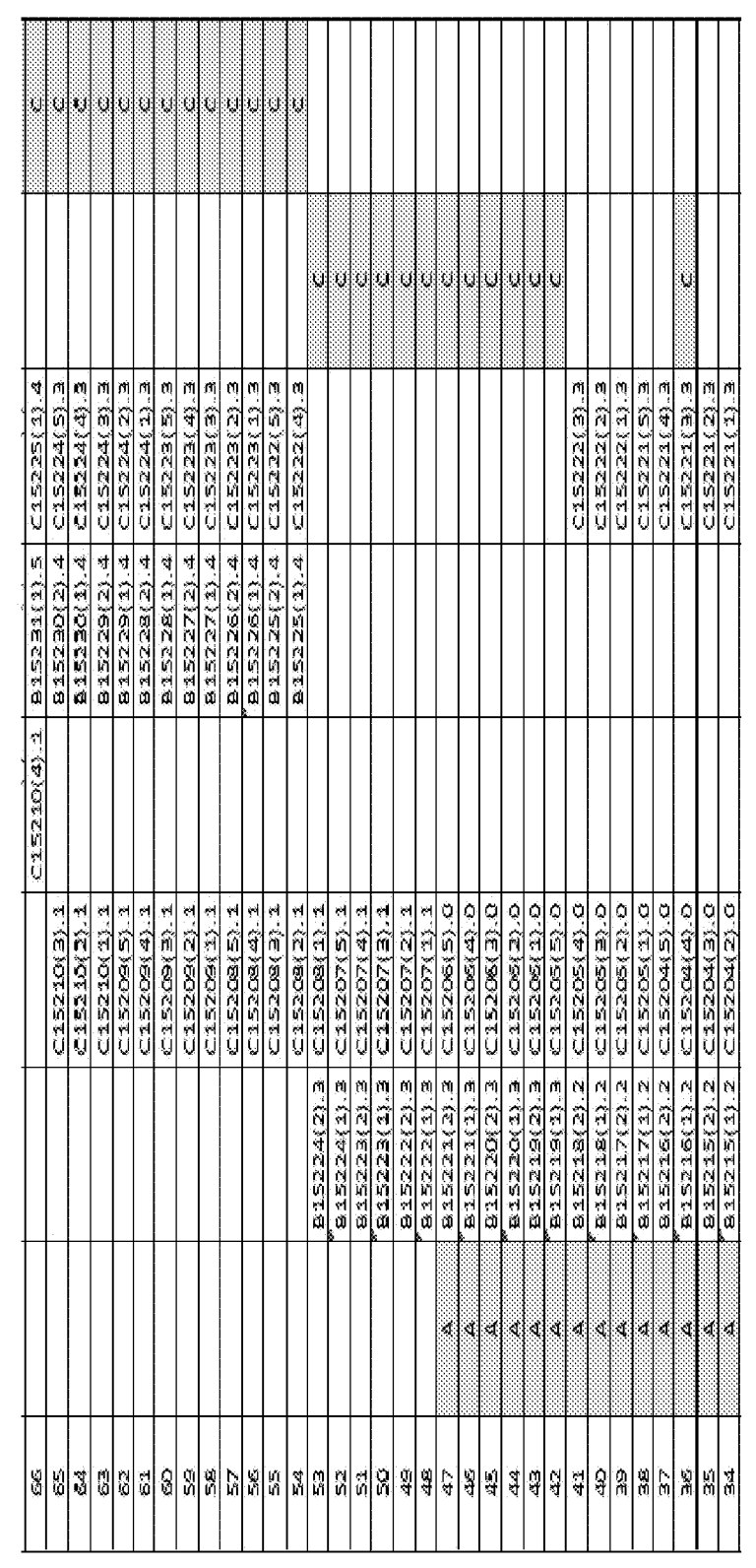

FIG. 12 illustrates low-order ODUj/ODUflex client datapath cycles according to an embodiment of the present disclosure. FIGS. 13A and 13B illustrate a multiplexer implementation for an S-T-S switch according to an embodiment of the present disclosure. FIGS. 14A and 14B illustrate an S-T-S switch Buffer in RAM for ODU2 example with W=48 bytes (<CH><J>(byte#).<datapath cycle>) according to an embodiment of the present disclosure. FIGS. 15A, 15B and 15C illustrate an S-T-S switch Buffer in RAM for ODU2 example with W=48 bytes with padding according to an embodiment of the present disclosure.

Figure 16:
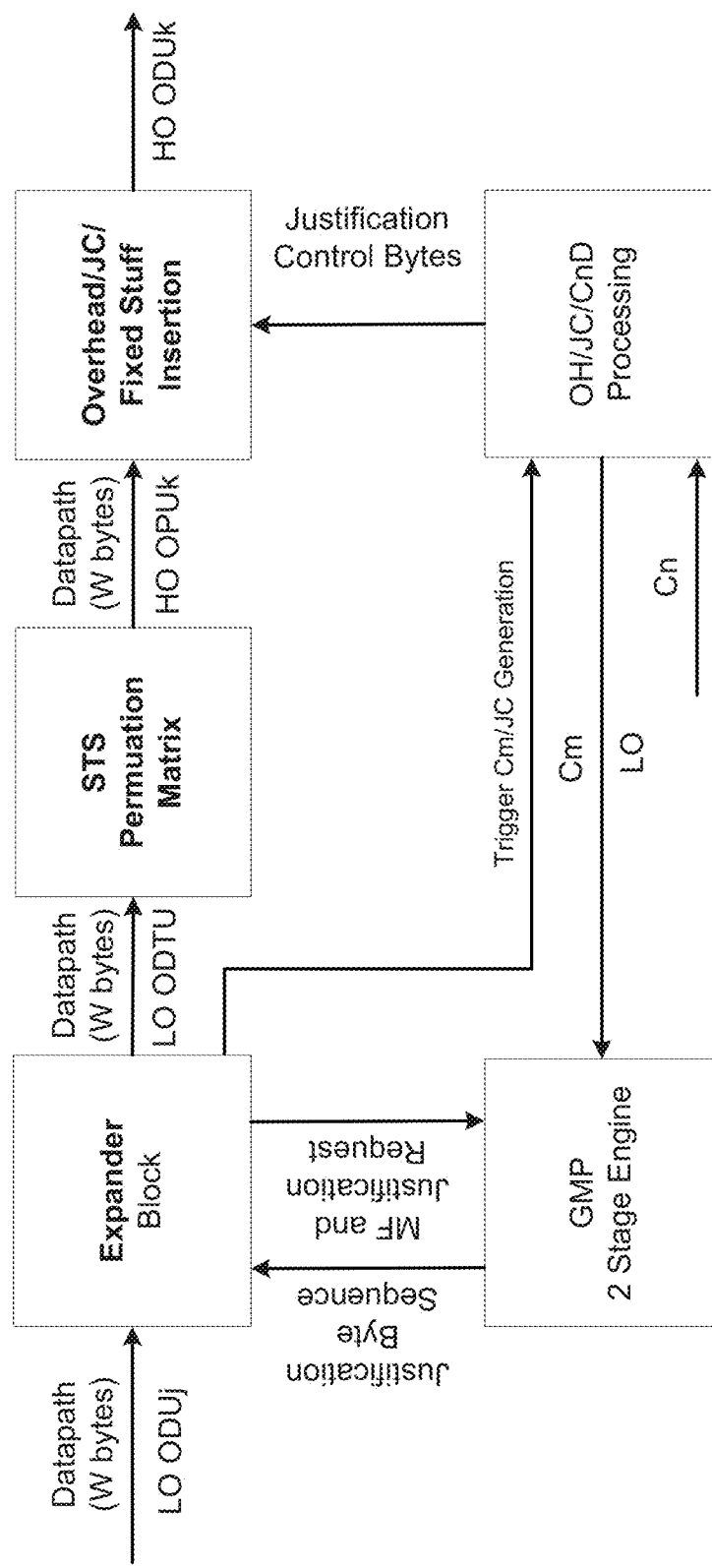
FIG. 16 illustrates an ODTU MUX according to an embodiment of the present disclosure.

An embodiment of the present disclosure provides the justification and multiplexing of multiple LO ODUj/ODUflex clients into a HO ODUk carrier as seen in FIG. 16. LO ODUj clients can be added or removed while other LO ODUj/ODUflex clients remain hitless during the operation. In G.7044 ODUflex LO client resizing, the ODUflex channel being resized and other LO ODU clients are hitless.

In the example embodiment as shown in FIG. 16, the ODTU MUX performs justification of multiple LO ODUj/ODUflex clients and then multiplexes them together into a HO ODUk carrier. GMP justification marks j=1 for each LO ODTUjk/ODTUk.ts which are the first words that belong to the HO ODUk payload (OPUk). These must remain aligned for both justification and multiplexing purposes. The end of multiframe (EOMF) padding bytes that complete the final buffer of the Permutation Matrix for that MF allow for LO ODUj/ODUflex addition or removal of LO ODUj/ODUflex clients while remaining hitless on other LO ODUj/ODUflex clients. The EOMF padding bytes also allow for G.7044 ODUflex hitless resize with respect to the Permutation Matrix settings. The stand-by configurations for the Permutation Matrix settings and the GMP M expansion allow the change to happen on a multiframe basis as controlled from the Expander block.

In an example embodiment, one expander block is provided for all channels. The expander block coordinates by HO for all client LO channels. A benefit in an approach according to an embodiment of the present disclosure is taking action on each portion (e.g. each LO channel) using TDM, keeping context for each individual LO. In a system according to an embodiment of the present disclosure, a single expander block and permutation matrix are used in TDM with context storage for multiple channels of either LO or HO. In an example embodiment, multiple HO permutation matrices are loaded in software for each HO. For example, based on the HO a different permutation matrix would be loaded in TDM. The STS can work on multiple HOs based on software configuration, but all in TDM. There is software configuration for each HO per-loaded, and each is independent.

The AMP JC bytes and GMP Cm are passed in parallel, beside the STS permutation matrix and therefore arrive ahead of the data going through buffers in the STS permutation matrix. A mailbox setup allows for simple, aligned synchronization between the data and justification information from the Expander block to the Insertion block without the complexity of a FIFO for the JC bytes or Cm values.

Figure 17:
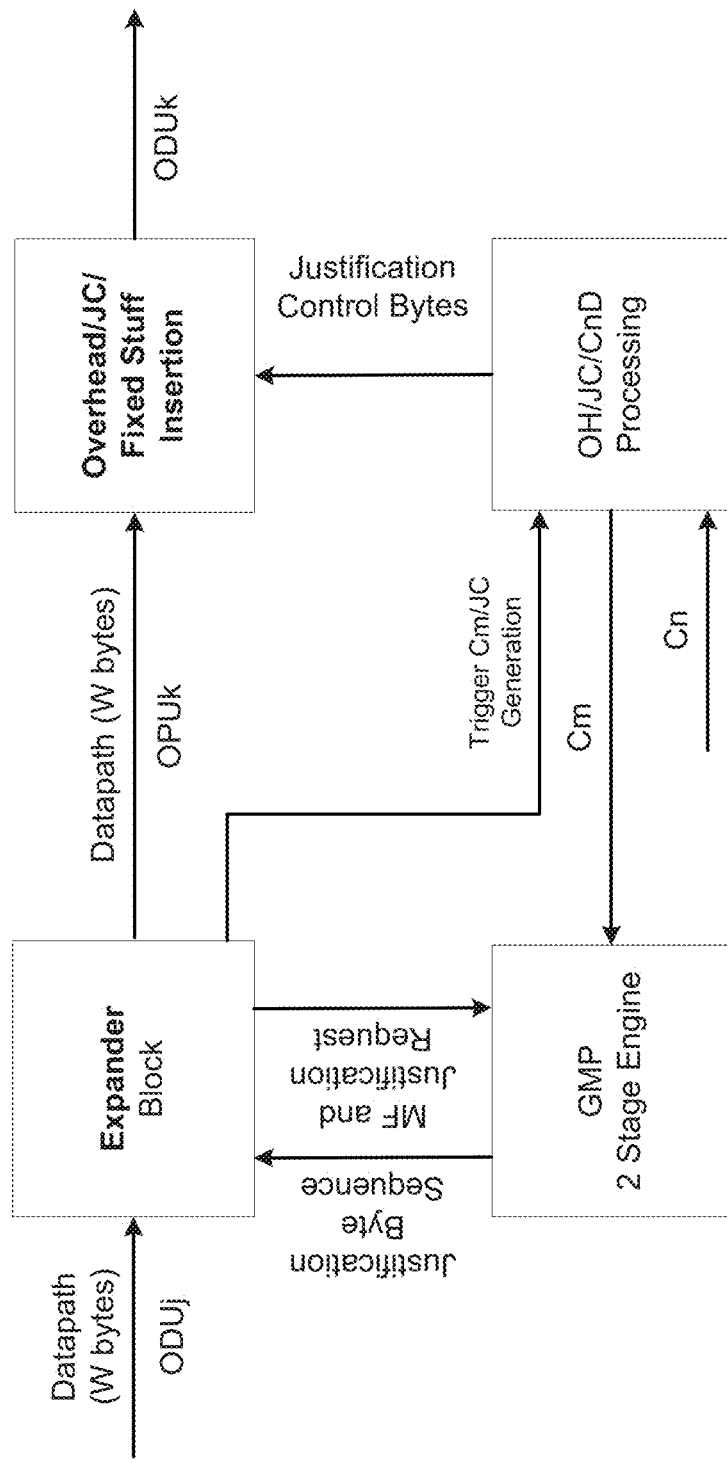
FIG. 17 illustrates ODUj mapping justification insertion according to an embodiment of the present disclosure.

A simplified embodiment without the S-T-S switch is shown in FIG. 17, the ODUj Mapper. In this implementation, reusing the same blocks allows for mapping of Constant Bit Rate (CBR) traffic into ODUj/ODUflex clients.] The split in structure EXPAND (gmp expansion) then STS (multiplexing) allows reuse of the same hardware for a non-multiplexing solution where the STS is removed. These would be previous stages mapping non OTN client streams into LO OTN client streams with AMP, GMP or BMP mappings.

Embodiments of the present disclosure pertain to the field of optical data communications. In particular, embodiments of the present disclosure provide a novel approach to the Multiplexing and Demultiplexing of Low-Order ODUj and ODUflex into a HO ODUk carrier as defined in ITU-T G.709, and are applicable to hitless resizing of Low-Order ODUflex clients as defined in ITU-T G.7044. In another embodiment, a simplified version of the embodiments described herein can be used to map and demap Constant Bit Rate clients into ODUk carriers.

Example embodiments provide gate savings over a brute force approach that is linear of Order (N) proportional to the data rate. Such advantages are apparent in a 120G device, and will become increasingly apparent and valuable in 400 Gbps and 1 Tbps devices.

Embodiments of the present disclosure provide one or more of the following features or advantages: multiplexing LO channels into HO through software configurable multiplexing structure with RAM and a Space-Time-Space Switch; reduce hardware generated selects, reduces size; allow for RAM storage instead of register during multiplexing, greatly reducing the size of the implementation; stand-by configuration allows for LO channel add/remove and LO ODUflex hitless resize; EOMF padding keeps the MF context the same in a single buffer and keeps the Permutation Matrix aligned with LO ODTU justification; synchronization of justification, justification control bytes and multiplexing through TDM control address bits and mailbox simplified FIFOs.

Other example embodiments comprise: a method to create a Permutation Matrix which reduces the hardware implementation size; a method to change the Permutation Matrix for LO channel add/remove hitless on other LO channels; a method to change the Permutation Matrix for LO ODUflex resize while remaining hitless on that channel; a method to coordinate justification and multiplexing patterns; a method to synchronize justification control bytes and multiplexing; and/or a method to synchronize latency, mailbox.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A system for multiplexing a plurality of Low-Order (LO) optical channel data unit (ODUj) data words into a High-Order (HO) ODUk carrier in an Optical Transport Network (OTN) comprising:
an apparatus configured to insert pad words among the plurality of LO ODUj data words, to justify the plurality of LO ODUj data words and to create expanded LO ODUj data words which together form an optical channel data tributary unit (ODTUjk); and
a space-time-space (STS) switch including a permutation matrix for re-arranging and multiplexing bytes in the expanded LO ODUj data words into HO ODUk words in accordance with a tributary slot assignment for a selected LO ODUj of the HO ODUk carrier;
wherein the STS switch comprises:
a plurality of ingress multiplexers and a plurality of egress multiplexers implementing space stages of the STS switch; and
a plurality of random access memories (RAMs) implementing a time stage of the STS switch, the RAMs configured to control the plurality of ingress multiplexers and the plurality of egress multiplexers.

2. The system of claim 1 wherein, for a W-byte LO ODUj cycle, where W is a positive integer, a multiplexer selects one of 2*W−1 RAMs to store received LO ODUj data words.

3. The system of claim 1 wherein, for each received byte, the STS switch determines an egress word and a byte within the determined egress word on which the received bye will be sent out.

4. The system of claim 3 wherein the STS switch comprises W ports, where W is a positive integer, and configurably assigns each byte on each ingress port of the W-port STS switch to an associated timeslot of an associated egress port.

5. The system of claim 1 wherein the re-arranged bytes comprise m bytes of the selected LO ODUj client when the selected LO ODUj client occupies m tributary slots in the HO ODUk.

6. The system of claim 1 wherein the plurality of LO ODUj clients comprises LO ODUflex clients.

7. The system of claim 1 wherein the expander block inserts generic mapping procedure (GMP) pad bytes among GMP data bytes.

8. The system of claim 7 wherein each GMP pad and GMP data word occupies the same number of bytes as the number of HO ODUk tributary slots occupied by the LO ODUj stream.

9. The system of claim 1 wherein the STS switch is configured to multiplex the plurality of LO ODUj clients to a plurality of HO ODUks, the STS switch further comprising a set of permutation matrices comprising one permutation matrix for each of the plurality of HO ODUks.

10. The system of claim 1 wherein the permutation matrix is reconfigurable for additions or removals of LO ODUj/ODUflex clients within the HO ODUk carrier.

11. The system of claim 1 further comprising a standby page of configuration settings in the permutation matrix, the standby page being updated with new settings that take effect at a next server multi-frame boundary, ensuring that existing LO ODUj/ODUflex clients are hitless during a change.

12. The system of claim 1 wherein the expander block inserts end of multiframe (EOMF) padding bytes that complete the final buffer of the permutation matrix for that multiframe, allowing for LO ODUj/ODUflex addition or removal of LO ODUj/ODUflex clients while remaining hitless on other LO ODUj/ODUflex clients.

* * * * *